(12) United States Patent
Musio et al.

(10) Patent No.: US 12,365,747 B2
(45) Date of Patent: Jul. 22, 2025

(54) METHOD FOR MANUFACTURING FLUOROPOLYMERS

(71) Applicant: SOLVAY SPECIALTY POLYMERS ITALY S.P.A., Bollate (IT)

(72) Inventors: Stefana Musio, Saronno (IT); Fiorenza D'aprile, Nova Milanese (IT); Serena Carella, Parabiago (IT); Valeriy Kapelyushko, Alessandria (IT); Bradley Lane Kent, Woolwich Township, NJ (US); Alessio Marrani, Lecco (IT)

(73) Assignee: SOLVAY SPECIALTY POLYMERS ITALY S.p.A., Bollate (Milano) (IT)

( * ) Notice: Subject to any disclaimer, the term of this patent is extended or adjusted under 35 U.S.C. 154(b) by 617 days.

(21) Appl. No.: 17/784,965

(22) PCT Filed: Dec. 9, 2020

(86) PCT No.: PCT/EP2020/085365
§ 371 (c)(1),
(2) Date: Jun. 13, 2022

(87) PCT Pub. No.: WO2021/116222
PCT Pub. Date: Jun. 17, 2021

(65) Prior Publication Data
US 2023/0002518 A1   Jan. 5, 2023

Related U.S. Application Data

(60) Provisional application No. 62/947,318, filed on Dec. 12, 2019.

(30) Foreign Application Priority Data

Jan. 24, 2020 (EP) .................................... 20153524

(51) Int. Cl.
| | | |
|---|---|---|
| C08F 4/40 | (2006.01) | |
| C08F 14/24 | (2006.01) | |
| C08F 210/02 | (2006.01) | |
| C08F 214/24 | (2006.01) | |
| C08F 214/26 | (2006.01) | |

(52) U.S. Cl.
CPC ............... *C08F 14/24* (2013.01); *C08F 4/40* (2013.01); *C08F 210/02* (2013.01); *C08F 214/245* (2013.01); *C08F 214/265* (2013.01)

(58) Field of Classification Search
None
See application file for complete search history.

(56) References Cited

U.S. PATENT DOCUMENTS

| | | |
|---|---|---|
| 2,594,560 A | 4/1952 | Howard, Jr. |
| 2,816,147 A | 12/1957 | Weber et al. |
| 3,069,401 A | 12/1962 | Gallagher |
| 3,401,155 A | 9/1968 | Giancarlo et al. |
| 3,767,634 A | 10/1973 | Scoggins |
| 3,847,881 A | 11/1974 | Mueller et al. |
| 4,338,237 A | 7/1982 | Sulzbach et al. |
| 4,469,854 A * | 9/1984 | Chandrasekaran ......... C08F 214/245 526/91 |
| 4,482,685 A | 11/1984 | Chin et al. |
| 4,535,136 A | 8/1985 | Wheland |
| 5,506,281 A | 4/1996 | Muhlbauer |
| 5,639,837 A | 6/1997 | Farnham et al. |
| 5,955,556 A | 9/1999 | McCarthy et al. |
| 2002/0198334 A1 | 12/2002 | Kaspar et al. |
| 2004/0235986 A1* | 11/2004 | Kaspar ............... C08F 214/222 523/201 |
| 2010/0022702 A1 | 1/2010 | Chen et al. |
| 2011/0092644 A1 | 4/2011 | Aten et al. |
| 2014/0058052 A1* | 2/2014 | Chernysheva ...... C08F 214/225 526/204 |
| 2016/0031130 A1 | 2/2016 | Sbriglia |
| 2017/0005354 A1 | 1/2017 | Inoue et al. |
| 2018/0105650 A1* | 4/2018 | Lowry ................. C08F 259/08 |

FOREIGN PATENT DOCUMENTS

| | | |
|---|---|---|
| CN | 102718907 A | 10/2012 |
| JP | 2014129465 A | 7/2014 |
| KR | 20120116259 A | 10/2012 |
| WO | 9624622 A1 | 8/1996 |
| WO | 9717381 A1 | 5/1997 |
| WO | 02088203 A2 | 11/2002 |
| WO | 2020127654 A1 | 6/2020 |

OTHER PUBLICATIONS

Pianca M. et al., "End groups in fluoropolymers", Journal of Fluorine Chemistry, 1999, vol. 95, pp. 71-84—Elsevier Science SA (14 pages).

(Continued)

*Primary Examiner* — Richard A. Huhn
(74) *Attorney, Agent, or Firm* — Osha Bergman Watanabe & Burton LLP

(57) ABSTRACT

The present invention relates to a process for preparing a fluoropolymer in a liquid reaction medium, comprising the following steps:
- provide a reactor containing a liquid reaction medium comprising water
- introduce in said reactor ethylene monomers and fluorinated monomers, said fluorinated monomers being selected from tetrafluoroethylene (TFE), chlorotrifluoroethylene (CTFE) or mixtures thereof,
- pressurize the reactor,
- initiate polymerization feeding into said reactor a redox initiator comprising an oxidising agent and a reducing agent, wherein said reducing agent in said redox couple initiator is free from sulphur atoms having an oxidation number of 4 or below, wherein the reaction medium is free of fluorinated surfactants.

14 Claims, No Drawings

(56) References Cited

OTHER PUBLICATIONS

ASTM E313-05—Standard Practice for Calculating Yellowness and Whiteness Indices from Instrumentally Measured Color Coordinates, 2005, p. 1-6 (6 pages).
International Search Report issued in International Application No. PCT/EP2020/085365, mailed Feb. 24, 2021 (4 pages).
Written Opinion issued in International Application No. PCT/EP2020/085365, mailed Feb. 24, 2021 (5 pages).

* cited by examiner

METHOD FOR MANUFACTURING FLUOROPOLYMERS

This application is a national stage entry under 35 U.S.C. § 371 of International Application No. PCT/EP2020/085365 filed 9 Dec. 2020, which claims priority to U.S. provisional application 62/947,318 filed on 12 Dec. 2019 and to EP Application Serial No. 20153524.2 filed on 24 Jan. 2020. The entire contents of these applications are explicitly incorporated herein by this reference.

TECHNICAL FIELD

The present invention relates to a method for the preparation of copolymers comprising recurring units derived from ethylene and recurring units derived from chlorotrifluoroethylene (CTFE) and/or tetrafluoroethylene (TFE), using a redox couple initiator. The method of the invention allows to prepare ethylene-tetrafluoroethylene (ETFE) copolymers and/or ethylene-chlorotrifluoroethylene (ECTFE) copolymers in an aqueous environment without requiring the use of organic solvents and/or fluorinated surfactants, allowing to simplify and reduce the environmental impact deriving from the production of such copolymers. The resulting copolymers have excellent physical and mechanical properties and, in particular, have a very low level of yellowing (discoloration).

BACKGROUND ART

Methods for preparing ETFE and ECFTE copolymers are well known in the art. Such copolymers are typically industrially prepared in an aqueous medium using peroxide initiators such as perhaloacyl peroxides, in particular bis(trichloroacetyl) peroxide (TCAP) is the most commonly used initiator in this field. Perhaloacyl peroxides are useful as polymerization initiators in particular in the polymerization of halogenated monomers, such as chlorotrifluoroethylene and tetrafluoroethylene. The absence of any hydrogen atom in these peroxides leads to the preparation of halogenated polymers having fully halogenated chain ends.

The perhaloacyl peroxide initiators are typically introduced in the reaction medium as solutions in halogenated hydrocarbons (as disclosed in U.S. Pat. No. 2,816,147). Such solutions have been used without further purification to initiate the polymerization reaction of halogenated monomers. In particular, solutions of bis(trichloroacetyl) peroxide in trichlorotrifluoroethane, in particular 1,1,2-trichloro-1,2,2-trifluoroethane, have been used in the preparation of polymers comprising chlorotrifluoroethylene, as described for instance in U.S. Pat. No. 3,847,881.

Halogenated hydrocarbons such as those disclosed in U.S. Pat. No. 2,816,147, e.g. trichlorotrifluoroethane, have a high potential for destroying ozone in the stratosphere and their production and use has been severely limited by the Montreal Protocol. Potential alternatives such as perfluorocarbons are also greenhouse gases and may contribute to global warming, therefore their use is restricted, so that they are not suitable for the replacement of trichlorotrifluoroethane.

Co-pending European patent application 18214305.7 describes the use of iso-octane as a solvent for the bis(trichloroacetyl) peroxide. Iso-octane is a good solvent for the initiator, still has the drawback of being a flammable solvent which may be a problem in terms of safe handling in some situations.

Another shortcoming of the prior art is the use of fluorinated surfactants in the conventional polymerization of ETFE/ECTFE (see for example U.S. Pat. No. 4,482,685). As it is well known to the skilled person, fluorinated surfactant are also undesirable from the environmental standpoint.

Alternative peroxides and persulfates have been considered as initiators for ETFE and ECTFE copolymers however many peroxide and persulfate initiators can only function effectively as initiators at a temperature which is sufficiently high to break the peroxide or persulfate bond, thus generating an amount of radicals which can initiate the polymerization. Most peroxides and persulfates require a relatively high temperature in order to be effective.

On the contrary it is preferable to manufacture ETFE and ECTFE at relatively low temperature because ETFE and ECTFE polymers are preferably formed by regularly alternating sequences of an ethylene monomer (ET) and a fluorinated monomer. The properties of these polymers are correlated to the presence of these regular alternating sequences so that in general the number of ET-ET, TFE-TFE or CFTE-CTFE sequences (while in part inevitable especially when ET is either in excess or in defect with respect to the fluorinated monomer) should be minimised for a given stoichiometry. As it is well known in the art, increasing the temperature of polymerization corresponds to an increase in irregular sequences which leads to deterioration of the polymer's properties. Therefore in general it is desirable to conduct the polymerization of ECTFE and ETFE in a range of temperature below 30° C. and preferably around 15° C. This further restricts the number of free radical initiators which can be used because many radical initiators require higher temperatures in order, for the radicals, to initiate and propagate the polymerization reaction.

On the contrary, redox initiators are formed by introducing in the reactor an oxidising agent and a reducing agent. The redox reaction is typically very fast even at very low temperatures and it causes the formation of radicals which, in the presence of polymerizable monomers, initiate their polymerization. Continuous controlled feeding of the redox initiator (typically in the form of two separate feeds of oxidising agent and reducing agent) can sustain the polymerization reaction until its completion. Methods of polymerization of ETFE and/or ECTFE using redox initiators are reported in the prior art, such as for example in WO97/17381. However the prior art methods use reducing agent typically containing bisulphites or other compounds comprising S(IV) atoms (atoms of sulphur at an oxidation number of +4). The applicant found that the use of bisulphites may cause discoloration in the polymers thereby obtained. Also for this reason the use of redox initiators found little industrial application so far in the ETFE/ECTFE industry.

Therefore a need exist to develop novel polymerization methods for forming ETFE and ECFTE polymers which employ redox initiators, which can be conducted at low temperature in an aqueous environment, do not require harmful solvents nor fluorinated surfactant, nor flammable solvents, and at the same time which leads to the formation of polymers which have the desired mechanical properties and show minimal or no yellowing/discoloration.

SUMMARY OF INVENTION

The present invention relates to a process for preparing a fluoropolymer in a liquid reaction medium, said process comprising the following steps:
provide a reactor containing a liquid reaction medium comprising water introduce in the reactor ethylene monomers and fluorinated monomers selected from TFE, CTFE or mixtures thereof, pressurize the reactor, initiate polymerization feeding into said reactor a redox initiator comprising an oxidising agent and a reducing agent, wherein said reducing agent in said redox couple initiator is free from sulphur atoms having an oxidation number of 4 or below, wherein the reaction medium is free of fluorinated surfactants.

DESCRIPTION OF EMBODIMENTS

The present invention relates to a method for preparing a fluoropolymer comprising recurring units deriving from chlorotrifluoroethylene (CTFE) and/or tetrafluoroethylene (TFE) monomers and recurring units deriving from ethylene monomers. The reaction is carried out in a liquid reaction medium comprising water, preferably wherein water is more than 50% or more than 80% or more than 95% by weight of the liquid reaction medium (considering as reaction medium the entire liquid content of the reactor excluding monomer, polymers, initiators and chain transfer agents), and can be carried out according to known techniques by copolymerization of the monomers. Typically the TFE and/or CTFE monomers and the ethylene monomers are fed into a sealed reactor, and are dispersed in a reaction medium comprising water and other optional additives, typically kept under stirring. It was found that in the process of the present invention the presence of a fluorinated surfactant is not necessary and therefore, in order to minimize the environmental impact, the process of the invention is performed in the absence of fluorinated surfactants. In some embodiments non-fluorinated surfactants may be used in order to aid the dispersion of the monomers, but preferably the method of the present invention is conducted in the absence of added surfactants.

The monomers are typically fed in gas form within the sealed reactor, preferably from separate gas streams. The gases containing the monomers may optionally contain also other gaseous components or be formed by the monomers only. The reactor is typically pressurized using the monomer containing gases up to a pressure of from 2 to 60 bar, preferably from 5 to 40 bar, more preferably from 8 to 20 bar. Typically one or more of the gases containing the monomers is continuously added in the reactor during the polymerization reaction in order to maintain the reactor pressurized within the desired range. Typically ethylene gas is used to maintain the reactor pressurized.

According to the present invention the polymerization is initiated by introducing in the reactor a water based redox initiator. A redox initiator comprises an oxidizing agent and a reducing agent. The two agents can be continuously introduced together in the reactor from two independent feeds, so that, when the oxidizing agent and the reducing agent get in contact with each other they form free radicals which are able to initiate the polymerization reaction. Alternatively, one of the oxidizing agent or the reducing agent may be present in the reaction mixture while the other component of the redox initiator is gradually fed during the course of the polymerization.

When the polymerization is completed, the feed of redox initiator is interrupted. At that point the reactor can be vented and the polymer is collected. Depending on the conditions of the reaction the polymer can be collected in the form of a slurry, an aqueous suspension or a latex. The polymer can then be extracted and processed further for any purpose using conventional techniques.

In the present invention the choice of the oxidizing agent is not particularly restricted, preferably the oxidizing agent is water soluble or water dispersible, this is advantageous because it does not require the use of an organic solvent to be introduced in the reactor. More preferably the oxidising agent comprises one or more compound selected from inorganic persulfates (e.g. alkali metal persulfate, in particular sodium persulfate, lithium persulfate, potassium persulfate or ammonium persulfate), inorganic peroxides (e.g. hydrogen peroxide, sodium peroxide, potassium peroxide, lithium peroxide, ammonium peroxide), manganese based oxidants (e.g manganese triacetate, permanganate metal salts, in particular alkali metal permanganates such as sodium, lithium and potassium permanganate) and organic peroxides (e.g t-butyl hydroperoxide, di-t-butyl peroxide, cumene hydroperoxide, t-amyl hydroperoxide). Organic peroxides can preferably be chosen to be hydrophilic enough to be used in an aqueous reaction medium without the need for an additional solvent. Preferred oxidizing agents comprise potassium permanganate. Also mixtures of the compounds listed above can be used as oxidising agents in the present invention.

In the present invention the reducing agent must be free from sulphur atoms having an oxidation number of 4 or below. Preferably the reducing agent is free of sulphur atoms. Suitable compounds usable as reducing agents for the present invention are hydroxylamine, hydrazine, ferrous iron, organic acids. Preferred reducing agents are organic acids, in particular oxalic acid, malonic acid and citric acid. A particularly preferred reducing agent is oxalic acid. Also mixtures of the compounds listed above can be used as reducing agents in the present invention.

In a particularly preferred embodiment the redox initiator comprises potassium permanganate as oxidising agent and oxalic acid as reducing agent.

As mentioned above the entire polymerization process is preferably conducted at a relatively low temperature of from 0 to 30° C., preferably from 5 to 20° C.

The control of the molecular weight of the fluoropolymers of the invention can be performed using techniques which are known to the skilled person, in particular by controlling the dosage of the initiator and/or by the use of chain transfer agents. Optional chain transfer agents may be added to the polymerization reactor at any stage of the polymerization reaction. Any chain transfer agent conventionally used in the polymerization of fluoropolymers, and in particular in the manufacturing of ETFE and ECTFE copolymers can be used in the present invention. Non limiting examples of suitable chain transfer agents are: alcohols, ketones, and carboxylic acid esters, halogenated hydrocarbons, mercaptans. Examples of suitable chain transfer agents are for example, isopropanol, methanol, acetone, ethyl acetate, chloroform, 1,1,2,2-tetrachloroethane, bromotrichloromethane, or butyl-mercaptan and others as disclosed in U.S. Pat. No. 3,069,401. The chain transfer agent is introduced into the reactor at the beginning of the reaction, or continuously or step by step during the polymerization. The amount of chain transfer agent can range within rather wide limits, depending on the polymerization conditions (reaction temperature, monomers, molecular weight required of the polymer, etc). Generally, such amount ranges between 0.001 and 5% by weight, preferably between 0.05 and 1% by weight, with respect to the total amount of monomers introduced in the reactor.

Preferably chain transfer agents for the present invention comprise C1-C4 hydrocarbons, or halogenated hydrocarbons. A particularly preferred chain transfer agent is chloroform. As known in the art in some cases certain comonomers (beyond ethylene, TFE and CTFE) can have the effect of a chain transfer agent. For example acrylic co-monomers can act as chain transfer agents.

The process of the invention can be applied to both a suspension polymerization process or to an emulsion polymerization process. It is however preferred to use a suspension polymerization process.

The method is carried out in a reaction medium which is free of fluorinated surfactants. "Fluorinated surfactants" in the present invention is meant to be compounds complying with formula (I) here below:

wherein:
  $R_{f\!s}$ is selected from a $C_5$-$C_{16}$ (per)fluoroalkyl chain (including chains which are linear, branched or containing a cycle), optionally comprising one or more catenary or non-catenary oxygen atoms, and a (per)fluoropolyoxyalkyl chain (including chains which are linear, branched or containing a cycle),
  $X^-$ is selected from —COO$^-$, —PO$_3^-$ and —SO$_3^-$,
  $M^+$ is selected from NH$_4^+$ and an alkaline metal ion, and
  k is 1 or 2.

Non limiting examples of fluorinated surfactants are the followings:
  (a) CF$_3$(CF$_2$)$_{n0}$COOM', wherein $n_0$ is an integer ranging from 4 to 10, preferably from 5 to 7, typically $n_1$ being equal to 6, and M' represents NH$_4$, Na, Li or K;
  (b) T-(C$_3$F$_6$O)$_{n1}$(CFXO)$_{m1}$CF$_2$COOM", wherein T represents a Cl atom or a perfluoroalkoxyde group of formula C$_x$F$_{2x+1-x'}$Cl$_{x'}$O, wherein x is an integer ranging from 1 to 3 and x' is 0 or 1, $n_1$ is an integer ranging from 1 to 6, $m_1$ is an integer ranging from 0 to 6, M" represents NH$_4$, Na, Li or K and X represents F or —CF$_3$;
  (c) F—(CF$_2$CF$_2$)$_{n2}$—CH$_2$—CH$_2$—RO$_3$M''', in which R is a phosphorus or a sulphur atom, M''' represents NH$_4$, Na, Li or K and $n_2$ is an integer ranging from 2 to 5;
  (d) A-R$_{bf}$—B bifunctional fluorinated surfactants, wherein A and B, equal to or different from each other, have formula —(O)$_p$CFX"-COOM*, wherein M* represents NH$_4$, Na, Li or K, X" is F or —CF$_3$ and p is an integer equal to 0 or 1, and R$_{bf}$ is a divalent (per)fluoroalkyl or (per)fluoropolyether chain such that the number average molecular weight of A-R$_{bf}$—B is in the range of from 300 to 1800.
  (e) cC6O4 (Perfluoro{acetic acid, 2-[(5-methoxy-1,3-dioxolan-4-yl)oxy]}), in acid from or as alkali metal or ammonium salts.

The process of the invention can be used to prepare copolymers comprising recurring units from ethylene and recurring units from fluoromonomers selected from CTFE and TFE. Other co-monomers can be present, it is however preferred that more than 70% in moles, more preferably more than 80% in moles, even more preferably more than 90% in moles, and most preferably more than 95% in moles of the recurring units of the polymer derive from either ethylene, TFE or CTFE.

In a preferred embodiment the CTFE or TFE copolymer of the invention comprise: (a) from 35 to 65%, preferably from 45 to 55% more preferably from 48 to 52% by moles of ethylene (E) and (b) from 65 to 35%, preferably from 55 to 45% more preferably from 52 to 48% by moles of chlorotrifluoroethylene (CTFE) and/or tetrafluoroethylene (TFE).

The CTFE or TFE copolymers of the invention may comprise from 0 to 10%, preferably from 0 to 5% by moles, based on the total amount of monomers, of one or more fluorinated and/or hydrogenated comonomer(s) different from CTFE, TFE and ethylene. Preferably, when present, the optional comonomer comprises a hydrogenated comonomer selected from the group of the (meth)acrylic monomers. More preferably the hydrogenated comonomer is selected from the group of the hydroxyalkylacrylate comonomers, such as hydroxyethylacrylate, hydroxypropylacrylate and (hydroxy)ethylhexylacrylate, and alkyl acrylate comonomers, such as n-butyl acrylate.

The ETFE and ECTFE copolymers obtained from the method of the present invention are endowed with the typical properties of the ETFE and ECTFE known in the art and are characterized by a particularly low yellow index of less than 25 (measured according to ASTM E313-05).

Without being bound by theory we believe that the reduced yellowness index is connected with the different chain terminations which are formed when the process of the invention is followed.

In fact the conventional initiation of the ECTF/ECTFE polymerization reaction using TCAP as initiator leads to the formation of end groups which are predominantly CCl$_3$: This because the initiation reaction for TCAP leads to the formation of Cl$_3$C$^-$ radicals, which ultimately lead to the chain termination reaction depicted below:

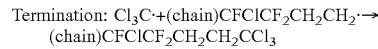

On the contrary, in the case for example of the Oxalic acid/permanganate redox couple, the initiation leads to the formation of COO$^-$ radicals which lead to the termination reaction depicted below:

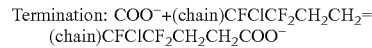

Similar terminations comprising a carboxylic group are formed for example whenever the reducing agent in the redox couple is an organic acid.

The method of the present invention requires that the reducing agent is free from Sulphur atoms having an oxidation number of 4 or below. Reducing agents of this type tend to form SO$_4^-$ And SO$_3$H$^-$ radicals which form sulphur containing chain termination according to the following termination reaction:

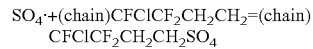

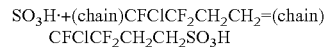

Without being bound by theory, these chain terminations are believed to have a negative influence on the yellowness index of the resulting material.

For these reasons fluoropolymers obtained from the method of the invention are characterized by having chain ends which are predominantly terminated with carboxyl groups in acid, salt or ester form and by a yellowness index measured according to ASTM E313-05 of less than 25. For "predominantly terminated" it is meant that, when considering all termination groups of the polymer, more than 50% of the chain terminations are carboxyl groups. In polymers according to the present invention typically the concentration of carboxyl groups containing chain termination is higher than 5 mmoles/kg of polymer.

Fluoropolymer chain ends can be determined via NMR with known methods as described in PIANCA, M., et al. End groups in fluoropolymers. Journal of Fluorine Chemistry. 1999, vol. 95, p. 71-84. Concentration of relevant chain ends are expressed as mmoles per kg of polymer.

Should the disclosure of any patents, patent applications, and publications which are incorporated herein by reference conflict with the description of the present application to the extent that it may render a term unclear, the present description shall take precedence.

The invention will be now described with reference to the following examples whose purpose is merely illustrative and not limitative of the scope of the invention.

Yellowness Index Test 0.15 grams of polymer powder obtained from the examples 1-5 were compression flash molded at 270° C. at a pressure of 160 bar, to a film 50 micrometers thick (circle shape about 45 mm diameter).

Yellow index of the films obtained was measured directly using a Gardner Colorimeter, according to ASTM E313-05, "Standard practice for calculating Yellowness and Whiteness indices from Instrumentally Measured Color Coordinates".

Rating was in the range from 0 to 100, wherein a smaller number indicate a lower (better) yellowness index.

Example 1—Comparative

An enamelled autoclave equipped with baffle and stirrer of Hastelloy C was freed from oxygen by alternative evacuation and purging with nitrogen, then 7.6 l of demineralized water, 1.3 l of methyl alcohol, 25 g of chloroform and 3.3 kg of chlorotrifluoroethylene were introduced. The stirrer was set at 600 rpm and the autoclave was heated to 15° C.; then ethylene gas was fed up to a pressure of 14.5 absolute bar. Polymerization was started by continuously feeding a trichloroacetylperoxide (TCAP) solution in isooctane, at −15° C., having a titre equal to 0.14 g TCAP/ml at a speed of 86 ml/h.

The pressure was maintained constant during the polymerization by continuously feeding ethylene to the reactor. After 300 minutes the polymerization was stopped by interrupting the initiator feed.

At the end of the polymerization 200 g of ethylene and 430 ml of initiator solution were used.

The resulting ECTFE polymer was discharged from the autoclave, centrifugated and dried at 120° C. for about 16 hours.

Example 2 According to the Invention

The same process used in Example 1 was used, except that a redox initiator was used instead of TCAP. The redox initiator was formed by an oxidizing agent (fresh potassium permanganate water solution having a concentration of 23.7 g/l) and a reducing agent (fresh oxalic acid ($C_2H_2O_4$) water solution having a concentration of 33.75 g/l). The two solutions were separately fed in the reactor at the same time through two different inlets at a speed of 230 ml/h each.

The polymerization was interrupted after 400 minutes.

At the end of the polymerization 200 g of ethylene and 1530 ml of each initiator solution were used. The ECTFE polymer was dried as in Example 1.

Example 3 Comparative

The same process of Example 2 was followed except that the oxalic acid solution was replaced with a sodium bisulfite solution having a concentration of 23.4 g/l. As in Example 2 the two solutions were separately fed in the reactor at the same time through two different inlets at a speed of 230 ml/h each.

The polymerization was interrupted after 173 minutes.

At the end of the polymerization 200 g of ethylene, were used. The ECTFE polymer was dried as in Example 1.

Example 4 Comparative

The same process of example 2 was followed except that chloroform was not introduced into the aqueous mixture and that the redox intiator was formed by:
TBHP (terbutylhydroperoxide) water solution with 34.44 g/l of TBHP
sodium hydroxymethanesulfinate (Bruggolite® E28) water solution having a concentration of 46.2 g/l.
The initiator solutions were fed at 300 ml/h each.
The polymerization was interrupted after 400 minutes.
At the end of the polymerization 200 g of ethylene, 2000 ml of each initiator solution were used. The ECTFE polymer was dried as in Example 1.

Experimental Results

| Example | Y index |
|---|---|
| 1 (comp.) | 10 |
| 2 (Inv.) | 10 |
| 3 (comp.) | 50 |
| 4 (comp.) | 70 |

The invention claimed is:

1. A process for preparing a fluoropolymer in an aqueous reaction medium, said process comprising the following steps:
   providing a reactor containing a liquid reaction medium comprising water,
   introducing in said reactor ethylene monomers and fluorinated monomers, said fluorinated monomers being selected from tetrafluoroethylene (TFE), chlorotrifluoroethylene (CTFE) or mixtures thereof,
   pressurizing the reactor,
   initiating polymerization feeding into said reactor a redox initiator comprising an oxidising agent and a reducing agent, wherein said reducing agent in said redox initiator is free from sulphur atoms having an oxidation number of 4 or below,
   wherein the reaction medium is free of fluorinated surfactants.

2. The process according to claim 1 wherein the reactor is pressurized at a pressure of 2 to 60 bar.

3. The process according to claim 1 wherein the oxidising agent and the reducing agent are continuously introduced at the same time in the pressurized reactor from two independent feeds.

4. The process according to claim 1 wherein one of the oxidising agent or the reducing agent is at least partially comprised into the liquid reaction medium while the other is continuously introduced into the pressurized reactor.

5. The process according to claim 1 wherein the oxidising agent comprises one or more from inorganic persulfates, inorganic peroxides, organic peroxides and manganese based oxidants.

6. The process according to claim 1 wherein the oxidising agent comprises one or more from manganese acetates, and permanganate metal salts.

7. The process according to claim 1 wherein the oxidising agent comprises potassium permanganate.

8. The process according to claim 1 wherein the reducing agent is free of sulphur atoms.

9. The process according to claim 1 wherein the reducing agent comprises one or more organic acids.

10. The process according to claim 1 wherein the reducing agent comprises Oxalic acid.

11. The process according to claim 1 wherein the polymerization is conducted at a temperature of from 0° C. to 30° C.

12. The process according to claim 1 wherein the liquid reaction medium also comprises a chain transfer agent.

13. The process according to claim 12 wherein the chain transfer agent is selected from C1-C4 halogenated hydrocarbons.

14. The process according to claim 12 wherein the chain transfer agent is chloroform.

\* \* \* \* \*